United States Patent
Kwon et al.

(10) Patent No.: US 7,097,344 B2
(45) Date of Patent: Aug. 29, 2006

(54) HOMOGENEOUS CELLULOSE SOLUTION AND HIGH TENACITY LYOCELL MULTIFILAMENT USING THE SAME

(75) Inventors: Ik-Hyeon Kwon, Seoul (KR); Soo-Myung Choi, Kyonggi-do (KR); Young-Soo Wang, Busan (KR); Sung-Ryong Kim, Daejon (KR); Jae-Shik Choi, Seoul (KR); Tae-Jung Lee, Kyonggi-do (KR); Seok-Jong Han, Kyunggi-do (KR); Myung-Woo Kim, Gyeongnam (KR)

(73) Assignee: Hyosung Corporation, Kyonggi-do (KR)

( * ) Notice: Subject to any disclaimer, the term of this patent is extended or adjusted under 35 U.S.C. 154(b) by 206 days.

(21) Appl. No.: 10/481,474

(22) PCT Filed: Oct. 24, 2003

(86) PCT No.: PCT/KR03/02251

§ 371 (c)(1),
(2), (4) Date: Dec. 18, 2003

(87) PCT Pub. No.: WO2005/000945

PCT Pub. Date: Jan. 6, 2005

(65) Prior Publication Data

US 2005/0160939 A1    Jul. 28, 2005

(30) Foreign Application Priority Data

Jun. 30, 2003  (KR)  ............ 10-2003-0043261
Jun. 30, 2003  (KR)  ............ 10-2003-0043262

(51) Int. Cl.
*C08L 1/00*     (2006.01)
*C29B 7/46*     (2006.01)
*C29B 13/00*    (2006.01)

(52) U.S. Cl. .......... 366/69; 366/83; 366/348; 106/200.2; 264/187; 264/203

(58) Field of Classification Search .......... 366/69, 366/76.1, 76.3, 83, 85, 86, 348; 264/187, 264/203; 106/200.2
See application file for complete search history.

(56) References Cited

U.S. PATENT DOCUMENTS

| 2,179,181 A | 11/1939 | Graenacher et al. |
| 4,142,913 A | 3/1979  | McCorsley, III et al. |
| 4,144,080 A | 3/1979  | McCorsley, III |
| 4,246,221 A | 1/1981  | McCorsley, III |

(Continued)

FOREIGN PATENT DOCUMENTS

EP    0 700 460 B1    3/1996

(Continued)

*Primary Examiner*—Tony G. Soohoo
(74) *Attorney, Agent, or Firm*—Nixon & Vanderhye P.C.

(57) ABSTRACT

The present invention relates to a method for making highly homogenized cellulose solution, wherein the cellulose solution is obtained by obtaining a solidified N-methylmorpholine-N-oxide (hereinafter, referred to as 'NMMO') hydrates which is solidified a liquid-state NMMO hydrates comprising 10 to 18% by weight water by using a simple screw-type feeder and by controlling the temperature, feeding the solidified NMMO into a twin-screw type extruder continuously, obtaining a cellulose solution which is fully swelled in a few minutes by dispersing and mixing with cellulose powder in the twin-screw type extruder, and extruding a highly homogenized cellulose solution by feeding the obtained cellulose solution into a melting zone of the extruder to melting the cellulose solution in a few minutes by minimum heat and shear force.

7 Claims, 2 Drawing Sheets

U.S. PATENT DOCUMENTS

| | | | |
|---|---|---|---|
| 4,416,698 A | 11/1983 | McCorsley, III | |
| 5,094,690 A | 3/1992 | Zikeli et al. | |
| 5,330,567 A | 7/1994 | Zikeli et al. | |
| 5,413,631 A | 5/1995 | Gray et al. | |
| 5,421,525 A | 6/1995 | Gray et al. | |
| 5,456,748 A | 10/1995 | Quigley et al. | |
| 5,534,113 A | 7/1996 | Quigley et al. | |
| 5,584,919 A | 12/1996 | Lee et al. | |
| 5,603,883 A | 2/1997 | Zikeli | |
| 5,626,810 A * | 5/1997 | Zikeli et al. | 264/187 |
| 5,747,125 A * | 5/1998 | Markulin | 428/34.8 |
| 5,826,978 A * | 10/1998 | Zikeli et al. | 366/176.4 |
| 5,888,288 A | 3/1999 | Quigley et al. | |
| 5,921,675 A | 7/1999 | Zikeli et al. | |
| 5,942,327 A | 8/1999 | Budgell et al. | |
| 5,948,905 A | 9/1999 | Connor et al. | |
| 6,153,003 A * | 11/2000 | Lee et al. | 106/200.2 |
| 6,677,447 B1 * | 1/2004 | Lee et al. | 536/56 |
| 6,812,270 B1 * | 11/2004 | Lee et al. | 524/35 |
| 6,902,804 B1 * | 6/2005 | Kwon et al. | 428/364 |
| 2003/0225206 A1 * | 12/2003 | Lee et al. | 525/54.3 |
| 2005/0019564 A1 * | 1/2005 | Kwon et al. | 428/364 |
| 2005/0066646 A1 * | 3/2005 | Kwon et al. | 57/258 |
| 2005/0154093 A1 * | 7/2005 | Kwon et al. | 524/35 |
| 2005/0160939 A1 * | 7/2005 | Kwon et al. | 106/200.2 |

FOREIGN PATENT DOCUMENTS

| | | |
|---|---|---|
| EP | 0 727 439 A1 | 8/1996 |
| GB | 1144048 | 3/1969 |
| GB | 2 374 326 A | 10/2002 |
| GB | 2 389 111 A | 12/2003 |
| WO | WO 97/47790 | 12/1997 |

* cited by examiner

HOMOGENEOUS CELLULOSE SOLUTION AND HIGH TENACITY LYOCELL MULTIFILAMENT USING THE SAME

TECHNICAL FIELD

The present invention relates to a manufacturing method for making highly homogenized cellulose solution, wherein the cellulose solution is obtained by obtaining a solidified N-methylmorphorine-N-oxide(hereinafter, referred to as 'NMMO') hydrates which is solidified a liquid-state NMMO hydrates comprising 10 to 18% by weight water by using a simple screw-type feeder and by controlling the temperature, feeding the solidified NMMO into a twin-screw type extruder continuously, obtaining a cellulose solution which is fully swelled in a few minutes by dispersing and mixing with cellulose powder in the twin-screw type extruder, and extruding a highly homogenized cellulose solution by feeding the obtained cellulose solution into a melting zone of the extruder to melting the cellulose solution in a few minutes by minimum heat and shear force.

The above cellulose solution can be used to manufacture an cellulose-made article such as fiber, filament, film or tube. More specifically, the highly homogenized cellulose solution which is minimized thermal-degradation according to the present invention can be used to manufacture a fiber and the fiber has excellent tenacity and dimensional stability and can be used for making industrial filament fiber or reinforcing material of rubber-made products such as tire or belt.

BACKGROUND ART

It has been proposed previously to make cellulose solution using the NMMO hydrates as follows.

U.S. Pat. Nos. 4,142,913, 4,144,080 disclose manufacturing methods for making cellulose solution by obtaining cellulose solution by under reduced pressure distillation of cellulose that is swelled and dispersed in NMMO hydrates, solidifying the cellulose solution to a precursor (solid-state) by cooling the cellulose solution(a kind if 'making chips') and melting in an extruder. These methods simplify the melting process by using an extruder, but require relatively long time and a large amount of energy because of the preceding 'making chips'. And also, the precursor is hard to protect from heat and humidity.

U.S. Pat. No. 5,584,919 discloses a manufacturing method for making cellulose solution by preparing solid-state NMMO comprising 5 to 17% by weight water, feeding the solid-state NMMO with cellulose powder into a horizontal cylinder-type high speed mixer and mixing them to make a granule type precursor, and melting the precursor using an extruder. This method, however, has a disadvantage of a wide distribution of the obtained the precursor and low yield. If the volume of the raw material is larger, the distribution of the obtained precursor is more widened. And a complicated cooling apparatus is required to transfer and store the precursor. And also, the solid-state NMMO is hard to manufacture and store.

U.S. Pat. Nos. 5,094,690, 5,534,113 and 5,603,883 disclose a manufacturing method for making cellulose solution by dispersing cellulose in the NMMO comprising 40% by weight water to make slurry, removing the water from the slurry by using a Force-drive type thin-layer distillation apparatus that can form a thin, solution-layer, and obtaining the cellulose solution. These methods, however, have disadvantages of a low efficiency to the volume of the raw material because the slurry was distilled the water and melted by rotating of the rotor so slurry was downstreamed. It caused a short dwelling time in the above apparatus. And also, these methods require a relatively long time and relatively a large amount of energy to produce cellulose solution, and the obtained fiber using the above cellulose solution gets worse the tenacity by degradation of cellulose and change of color of the NMMO.

U.S. Pat. Nos. 5,421,525, 5,456,748, 5,534,113 and 5,888,288 disclose manufacturing methods cellulose solution by mixing pulp crashed into irregular flat type with NMMO comprising 22% by weight water in a horizontal cylinder-type mixer and swelling them, swelling again by stirring for hours in a storage hopper, removing the water form the high viscid solution by using a Force-drive type thin-layer distillation apparatus so as to obtain the melted cellulose solution. These methods, however, have a disadvantage of extra handling and feeding of dust pulp produced as by-product during when crash the pulp into irregular flat type pulp. And also, it is hard to operate the horizontal cylinder-type mixer to discharge the swelled solution. In U.S. Pat. No. 5,921,675 discloses a horizontal cylinder-type mixer comprising a conveyor screw at the outlet of the mixer.

U.S. Pat. No. 5,948,905 discloses a manufacturing method for making cellulose solution by distilling the water from a mixture of cellulose and NMMO hydrates comprising about 23% by weight. In this method, the mixture was distilled under reduced pressure during passing the nozzle having 1.5 to 6.0 millimeter diameter. It is composed of multi-stage chambers. The first-stage chamber has a small number of nozzles having relatively large diameter. As the chamber's stage is increased, the number of nozzle is increased and the diameter of the hole of the nozzle is decreased so as to increase the cross-sectional area in order to upgrade the efficiency of water vaporization. At the stage of eighth, the last stage, an extruder is used. This method, however, has a disadvantage of needing of a highly complicated apparatus that is composed of many chambers different each other and comprised too many screws for shifting the chambers and distilling stages.

PCT WO 1997/47790 discloses a manufacturing method for making cellulose solution by solving cellulose powder in the liquid-state NMMO directly in a twin-screw type extruder. The cellulose solution is produced by feeding the liquid-state NMMO comprising 12% by weight water into the first barrel of the extruder maintaining an inner temperature of 100° C., feeding cellulose powder into the third barrel of the extruder maintaining an inner temperature of 75° C., shifting and mixing them, and obtaining the solution by rising the temperature to 120° C. In this method, however, three barrel of the extruder is used for feeding the cellulose powder and NMMO, and another barrel is required for melting the cellulose. In fact, there is a relatively short swelling zone so as to obtain cellulose solution comprising not-liquified cellulose particles. So, this method is effective to proceed relatively small amount of raw material, however, it is not proper to adapt a mass production of cellulose solution because there are too many not-liquified moiety. And it is not proper economically because of requiring a lot of filter system. And also, this method has a disadvantage of too short spinning cycle. If the swelling zone of the extruder is increased by increasing the number of blocks and the L/D(length/diameter) of the screw, it is hard to control the swelling condition and the melting condition concurrently because the screws of the extruder are driven by single driving shaft.

Korean patent application laid-open publication No. 2002-24689 discloses a manufacturing method for making highly homogenized cellulose solution by obtaining a mixture of swelled cellulose pulp powder and liquid-state NMMO by using the liquid-state NMMO that is overcooled by cooling air and melting the mixture. This method, however, is hard to control the temperature of the overcooled NMMO by using the cooling air and to control the content of the NMMO because of exposing of the moisture contained in the cooling air.

After being disclosed in U.S. Pat. No. 2,179,181 granted to Graenacher and Sallman(1939) and the British Pat. No. 1,444,080 granted to Johnson tertiary amine oxide as the one of the most powerful solvent for solving cellulose, there are many patent and literature disclosed the using of the solvent. And NMMO is the most popular solvent among tertiary amine oxide. The oxygen of the N—O group, active moiety, of the NMMO can form a inter-molecular linkage with hydroxy group of a material such as cellulose so as to penetrate easily in the crystalline structure of the cellulose. Chanzy et al. subscribed that there are some differences of reaction activation according to the extent of hydration of the NMMO and temperature.

DISCLOSURE OF INVENTION

We, the inventors of the present invention, find out that there are many factors that affect to the reaction activation. And, the factors are the concentration of cellulose, degree of polymerization (DP) of cellulose, a contacting method and apparatus of cellulose and NMMO and the state of NMMO (liquid-state, solid-state or mid-state thereof) except the temperature.

As described above, the prior arts provided manufacturing methods for making cellulose solution by contacting cellulose with NMMO containing 20 to 40% by weight water firstly, then, distilling the water by using a variety of distillation apparatus, followed by swelling and melting the cellulose. There are, however, some disadvantages of shifting high viscose solution, equipping an apparatus for dwelling the raw materials for the time to distill the water from high viscose solution, an over-sizing of an apparatus for distilling water under reduced pressure and a large amount of energy consuming, etc. And, there is an idea according to the prior arts to manufacture cellulose solution by solving cellulose powder directly in the liquid-state NMMO comprising about 13% by weight. This method, however, has a disadvantage of remaining not-liquified moiety that caused by melting the cellulose immediately without swelling when the cellulose contacts with the NMMO maintaining at the temperature of 80° C. (the crystallization temperature of NMMO) or more that has too high reaction activation.

When observing the cellulose fiber of the pulp for solving morphologically, the holes (hereinafter, referred to as 'pit') that penetrate water and the thickness of the cell wall were distributed not uniformly. So, there are some areas that water can penetrate easily and other areas that water can penetrate hardly. And this made some differences to penetrate NMMO in the cellulose in a pre-determined time. And, this tendency were showed in case of manufacturing pulp from wood fiber according to the kinds of wood fiber and processes used for making pulp. Consequently, to obtain fully homogenized cellulose solution, it is required that the solvent is fully penetrate to the cellulose wholly and swelled the cellulose. Otherwise, there remains some not-liquified moiety by not fully melted that caused by regional differences of the solubilities inter- or intra-fibers of the cellulose fibers.

According to the present invention, twin-screw type extruder is used that can swell the cellulose in a relatively short time by forcing excellent shear force and dispersion force so as to fully and uniformly penetrate the solvent into the cellulose. In recent, the twin-screw type extruder has an excellent applicability to the viscose solution and kneading property and easy to control the temperature is used as continuous type polycondensation apparatus or depolymerization apparatus in substitute for batch-polymerization system as known.

And the twin-screw type extruder system also can be used for chemically reforming apparatus and polymer compounding apparatus. The present invention is to provide a manufacturing method for making cellulose solution by cooling the liquid-state, concentrated NMMO under the melting point of the NMMO to produce firstly solid-state NMMO by using extra screw system maintaining at relatively low temperature.

According to the present invention, it is characterized that the two raw materials are fed into an extruder as solid-state, and then, the cellulose are fully swelled by dispersing, mixing, compressing and shearing, followed by melting the cellulose. It is also possible to produce a powder type, solid-state NMMO by using a side feeder of the twin-screw type extruder having narrow pitch screw. It can be uniformly dispersed and mixed with cellulose.

Cellulose solution can be made at relatively low temperature by using high shearing force for 10 minutes or less, and the obtained cellulose solution that is minimized the degradation of the cellulose and NMMO can be used to manufacture not only fibers for clothes but also industrial fiber such as tire cord that requires high tenacity.

It is an object of the present invention to provide a manufacturing method for making cellulose solution that is homogenized. It is another object of the present invention to provide a manufacturing method for making lyocell fiber to produce tire cord that has excellent tenacity and modulus in a high productivity.

The foregoing objects and others are accomplished in accordance with the present invention, generally speaking, by providing a method for making cellulose solution, the method comprising steps of: (A) preparing solid-state NMMO by cooling liquid-state NMMO within a few seconds by using a side feeder of a twin-screw type extruder, and then, feeding the solid-state NMMO into the twin-screw type extruder; (B) compressing and feeding cellulose powder within a few seconds by using side feeder of the twin-screw type extruder at the same time of the above step (A); and (C) obtaining cellulose solution swelled and homogenized from the cellulose powder and solid-state NMMO by the twin-screw type extruder having a screw to be subjected to dispersing, mixing, shearing, kneading, melting and measuring processes.

It is another object of the present invention to provide cellulose fiber having excellent tenacity that is produced by a method comprising a step of (D) after-treating the obtained multi-filament by washing, drying, oil-treating and winding. The obtained cellulose fiber has some properties of (1) a tenacity of 5 to 10 g/d, (2) an elongation of 4 to 15%, (3) a modulus of 200 to 400 g/d, (4) a birefringence of 0.01 to 0.1 and (5) a shrinkage of −0.5 to 5%.

The solid-state NMMO can be obtained by cooling the liquid-state NMMO comprising 10 to 18% by weight water, and more specifically, about 13% by weight water in substituent for the liquid-state NMMO in the prior art under its melting point by contacting it with a screw maintaining the temperature of −10 to 80° C. at the steps (A) and (B) of the present invention. The obtained, solid-state NMMO powder and cellulose powder are fed into coinstantaneously into a twin-screw type extruder and dispersed, mixed and sheared them in the extruder so as to swell and disperse them, and, finally, expelled in the form of homogeneous cellulose solution by liquefied in the liquidifying stage.

High tenacity cellulose fiber according to the present invention is manufactured by feeding solid-state NMMO and cellulose powder coinstantaneously into a twin-screw type extruder, dispersing, mixing and shearing them in the extruder so as to swell and disperse them, expelling in the form of homogeneous cellulose solution, and spinning the obtained homogeneous cellulose solution.

It is required to use pulp having a high degree of purity of cellulose. It is known as the lignin having amorphous structure and hemicellulose having low crystalline structure. So, to obtain high quality cellulose fibers, it is preferred that the contents of the lignin and hemicellulose be lower and the content of a-cellulose be higher. Cellulose fiber having good physical and chemical properties can be obtained using cellulose molecules that is highly oriented and highly crystallized by using cellulose having high degree of polymerization. More specifically, it is preferred to use wood pulp that the DP (degree of polymerization) is 800 to 1,200 and the content of α-cellulose is 93% or more.

According to the present invention, it is characterized in that the solid-state NMMO is prepared firstly by cooling the liquid-state NMMO containing 10 to 18% by weight water, and more specifically, about 13% by weight water in substituent for the liquid-state NMMO in the prior art under its melting point by contacting it with a screw maintaining the temperature of −10 to 80° C., and more specifically 10 to 50° C. If the temperature of the screw is −10° C. or less, it is not proper economically because of requiring another barrel to maintain the screw at low temperature, and if the temperature of the screw is 80° C. or more, the liquid-state NMMO cannot solidified to solid-state NMMO.

According to the present invention, it is preferred to use NMMO containing 10 to 18% by weight water in substituent for the liquid-state NMMO. If the content of water is 10% by weight or less, it is not proper to economically because of the cost for concentrating the content of water less than 10% by weight, and if the content of water is 18% by weight or more, the solubility is lowered.

In the present invention, the diameter of the cellulose powder using in the step (A) is not greater than 5,000 micrometer, and more specifically, not greater than 500 micrometer. If the diameter is 5,000 micrometer or more, the solubility of the cellulose is lowered because entanglement of the cellulose powder is occurred when solving the cellulose powder.

In the present invention, the content of the cellulose powder in the solid-state NMMO is in the range of 3 to 20% by weight. If the content of the cellulose powder is less than 3% by weight, the properties of the obtained cellulose fiber is too lowered, and the content of the cellulose powder is more than 20% by weight, the solubility of the cellulose is lowered.

According to the present invention, the twin-screw type extruder using in the step (B) to proceed swelling and homogenizing the cellulose powder and the solid-state NMMO so as to produce a cellulose solution has 3 to 16 barrel or 12 to 64 L/D of the screw. If the barrel is less than 3 or the L/D of the screw is less than 12, the cellulose solution expelled through the barrel is too small so as to produce not-liquified moiety in the solution, and if the barrel is more 16 or the L/D of the screw is more than 64, the screw of the extruder can be deformed because of hard stress acted to the screw.

According to the present invention, the cellulose powder in the step (B) can be mixed with other polymer or additives. Polyvinylalcohol, polyethylene, polyethyleneglycol or polymethylmethacrylate can be used as the above polymer, and thickner, titanium dioxide, silica (silicon dioxide), carbon or ammonium chloride can be used as the additives.

BRIEF DESCRIPTION OF DRAWINGS

Further objects and advantages of the invention can be more fully understood from the following detailed description taken in conjunction with the accompanying drawings in which.

BEST MODE FOR CARRYING OUT THE INVENTION

Figure 1:
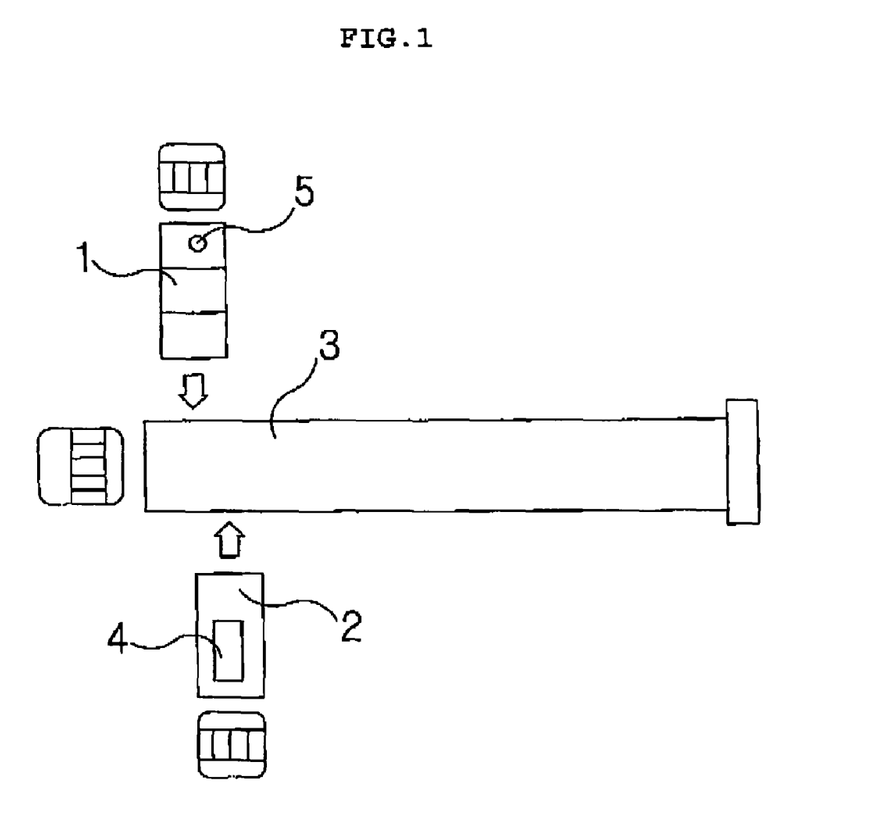
FIG. 1 is a scheme of the manufacturing apparatus for making cellulose solution according to the present invention.

FIG. 1 shows the twin-screw type extruder for feeding NMMO and cellulose powder and referring FIG. 1, the twin-screw type extruder 3 has a first side feeder 1 and a second side feeder 2. Initial liquid-state NMMO containing water is input into the first side feeder 1 through a first inlet 5 and is changed into solid-state NMMO immediately before being fed into the twin-screw type extruder 3. At the same time the cellulose powder is put into the second side feeder 2 through a second inlet 4.

Specifically, FIG. 1 is a schematic representation of a manufacturing apparatus for making cellulose solution according to the present invention, a pre-concentrated, high concentration, liquid-state NMMO comprising 10 to 18% by weight water, and more specifically, 12 to 15% by weight water is fed into the inlet (5) by using a fixed quantity-pump, and simultaneously, the liquid-state NMMO is converted into a solid-state NMMO in a few seconds by using the side feeder(1) of the twin-screw type extruder(3). And, at the same time, cellulose powder having its diameter not greater than 5,000 micrometer is compressed and fed into the twin-screw type extruder(3) continuously by using the side feeder 2 of the twin-screw type extruder.

The cellulose solution swelled and homogenized can be obtained from the solid-state NMMO and the cellulose powder by the twin-screw type extruder which is configured a screw to proceed dispersing, mixing, shearing, kneading, melting and measuring. And the manufacturing method for making cellulose solution according to the present invention characterized in that the method is carried out by using the twin-screw type extruder system and the two raw materials were fed into the extruder by using a side feeder continuously and there is not included a water distillation apparatus using extra vacuum apparatus in the system.

Figure 2:
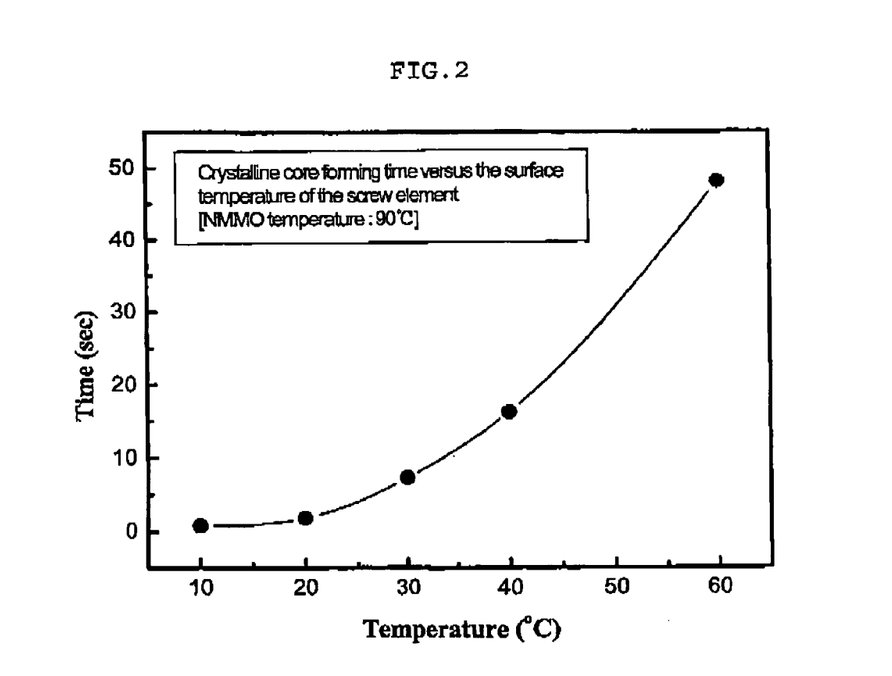
FIG. 2 is a graph illustrating crystalline core forming time versus the surface temperature of the screw element of the manufacturing apparatus for making cellulose solution according to the present invention.

FIG. 2 is a graph illustrating crystalline core forming time versus the surface temperature of the screw element of the manufacturing apparatus for making cellulose solution according to the present invention, and in order to measure the time needed for solidifying the liquid-state NMMO to solid-state NMMO, the crystalline core forming time is measured at the surface temperature of the screw element when the liquid-state NMMO is contacted with the screw element by the thickness of 2 millimeter. As shown in FIG. 2, when the temperature of the NMMO is 90° C., and the temperature of the screw element is 30° C. or less, the crystalline core is formed within 10 seconds.

Hereinafter, the manufacturing method for making cellulose fiber comprising the step of spinning the obtained, homogeneous cellulose solution, washing, drying and winding is described in detail as follows. The cellulose fiber according to the present invention, however, is not limited to the cellulose fibers obtained by the following processes.

In the manufacturing method according to the present invention, the (C) step of a spinning step, is carried out by expelling and spinning the obtained dope through a spinning nozzle comprising a number of orifice, and the orifice has 100 to 300 micrometer of diameter, 200 to 2,400 micrometer of length, and L/D of 2 to 8 times, and the distance between the orifices is 1.0 to 5.0 millimeter, and solidifying the fiber-shaped dope through an aeration layer and solidifying bath so as to obtain multi-filament fiber.

The spinning nozzle used in the above has a round shape, and the diameter of the nozzle is in the range of 50 to 200 millimeter, and more specifically, in the range of 80 to 130 millimeter. If the diameter of the nozzle is 50 millimeter or less, it is too short the distance between the orifices so the efficiency of cooling is to be lowered and the fiber-shaped dope is tend to stick each other before they were solidified, and if the diameter of the nozzle is 200 millimeter or more, the pack for spinning and nozzle are too bulky. Also, diameter of the orifice is 100 micrometer or less, there is a tendency to occur many breaking-fiber and the spinning efficiency is too low, and if the diameter of the orifice is 300 micrometer or more, the solidifying speed is too late at the solidifying bath and the washing of NMMO is hard. If the length of the orifice of the nozzle is 200 micrometer or less, the dope is not fully oriented so the obtained fiber has a bad property, and if the length of the orifice of the nozzle is 2,400 micrometer or more, it is hard to produce the orifice itself.

It is more preferred to use the nozzle comprising 500 to 2,200, and more specifically, 700 to 1,400 of the orifice number for making industrial fiber, more specifically, for making tire cord, and for cooling the dope uniformly. There were some efforts for making lyocell fiber, however, there is no report that high tenacity filament for tire cord was manufactured successfully. As the number of filament is increased when spinning, there are many factors that affect to the efficiency of spinning and high degree spinning techniques are required.

According to the present invention, to solve the above problems, the spinning nozzle comprising 500 to 2,200 of the orifice number is used. If the number of the orifice is 500 or less, the fineness of each filament is too thick to extract the NMMO from the filament in a short time so solidifying and washing the filament cannot be enough. And if the number of the orifice is 2,200 or more, it is easy to contact between the filaments in the area of aeration layer, and after spinning, the stability of each filament is too lowered so as to occur lowering of properties of the obtained fiber. Moreover, the obtained fiber is hard to process of twisting thread and heat-treating for producing tire cord.

When the dope passed the spinning nozzle is conjugated in the upper conjugation bath, the filament formed from the dope is too thick, the differences of the conjugation speed between the surface and inner part so that the fiber having fine and uniform texture hardly can obtained. Therefore, in case of the same amount of dope is spinning, the filament can be fed into the conjugation bath maintaining more thin diameter by controlling the aeration layer properly. If the air-gap(length of the aeration layer) is too short, it is hard to increasing the ratio of drawing because of rapid surface-solidifying, increasing the ratio of micropores-forming during desolventation, and these makes hard to increase the ratio of drawing of the filament and also hard to increase the speed of the spinning for making filament. Contrary, if the air-gap is too long, it is hard to maintain the stability of the processing because of adhering between filaments and influences of ambient temperature and humidity.

The air-gap is 10 to 200 millimeter, and more specifically, 20 to 100 millimeter. When the filament is passing the air-gap, cool air can be fed in order to preventing adhering between filaments by cooling and solidifying the filament, and at the same time, increasing the penetration resistance to the solidifying solution. The cool air can be controlled by monitoring the temperature and humidity of the air by a sensor located between the inlet of the cooling air supplying means and filament. The temperature of the air can be controlled in the range of 5 to 30° C. If the temperature of the air is 5° C. or less, the solidification of the filament is too rapid so high-speed spinning is hard to proceed, and also it is not proper economically because of overcooling the air. Contrary, if the temperature of the air is 30° C. or more, the penetration resistance of the dope to the solidifying solution is too lowered so breaking-fiber can be occurred.

Also, the content of the water in the air is one of the most important factors and it can affect the solidifying of the filament. It is preferred to control the relative humidity in the range of 10 to 50% RH. More specifically, it is preferred to provide dry air controlled to the relative humidity in the range of 10 to 30% RH to the surroundings of the nozzle, and wet air controlled to the relative humidity in the range of 30 to 50% RH to the surroundings on the solidifying solution in order to increase the stabilities of the speed of solidifying of the filament and sticking at the surface of the nozzle. It is preferred to blow the cooling air horizontally to the side face of the filament that expelled downwardly. It is preferred to control the speed of the cooling air in the range of 0.5 to 10 m/second, and more specifically, in the range of 1 to 7 m/sec. If the speed of the cooling air is too slow, the cooling air cannot prevent the other conditions of ambient atmosphere, and it is hard to obtain uniform filament because there are some differences of solidifying speed in the area contacting with the cooling air at the latest and breaking-fiber. Otherwise, if the speed of the cooling air is too fast, the spinning efficiency is too low, caused by swinging the course of the filament, adhering between filaments and preventing uniform flowing of the dope.

The composition of the solidifying solution used in the present invention is 5 to 40% by weight of aqueous NMMO solution. When the filament passing the conjugation bath, the speed of spinning is 50 m/minute or more, the shaking of the conjugation solution will be extreamed by the friction between the filament and the conjugation solution. In order to increase the productivity by increasing the speed of spinning and to achieving excellent properties through elongation and orientation, it is required to minimize these phenomena because these phenomena can affect to the stability of the processing.

In the step (D) according to the present invention, the obtained multi filaments are introduced into the washing bath, and washed them. As a desolventation and elongation that can affect the properties of the filament greatly were occurred constantly during passing the solidifying bath, the temperature and concentration of the solidifying solution should be maintained constantly. The filament that passed out the solidifying bath washed in the washing bath. The washing method is well known to the ordinary skilled technical expert in the art.

The washed filament, then, dried and oil-treated, followed by winded. Drying, oil-treating and winding processes are well known to the ordinary skilled technical expert in the art. Then, the obtained filament can be used for manufacturing of tire or industrial filament.

The obtained lyocell multi filaments according to the present invention have 1,000 to 3,500 of total deniers and 8.0 to 18.0 kilogram of cutting load. The multi filaments comprise 500 to 2,200 of filament, and each filament has a fineness of 0.5 to 4.0 deniers. The filament also has a tenacity of 5.0 to 10 g/d, an elongation ratio of 4 to 10%, an elongation ratio at 4.5 kilogram load of 0.5 to 4.0%, a modulus of 200 to 400 g/d, birefringency of 0.030 to 0.060, a shrinkage of −0.5 to 3%. So, the filament is useful to manufacture a tire cord of automobile.

High tenacity cellulose fiber according to the present invention can be obtained by providing solid-state NMMO by solidifying liquid-state NMMO in a few seconds using a side feeder of a twin-screw type extruder, feeding the solid-state NMMO into the twin-screw type extruder, compressing cellulose powder in a few seconds using the side feeder of the twin-screw type extruder and feeding it into the extruder so as to disperse and mix them each other, shearing them to convert them into homogeneous cellulose solution which swelled and dispersed and spinning the dope(the homogeneous cellulose solution).

Raw cord for tire of automobile is manufactured from the obtained lyocell multi filament by twisting the two strands of filament using a direct twist machine which can twisting at the same time. Two strands of the obtained yarns were plied and cabled, and then, twist and add two strands of filaments to prepare a cord yarn. Generally, the degree of plying and cabling are the same. That can be possible to maintain the obtained tire cord in straight state without rotation or entanglement. And the properties such as tenacity, elongation, mid-elongation, the degree of anti-fatigue can be changed according to the degree of twisting. Generally speaking, if the degree of twisting is increased, the tenacity is lowered, elongation at cutting are increased. And, it has a tendency to increase the degree of anti-fatigue. According to the degree of twisting.

Thus obtained raw cord can be weaved using high speed weaving machine. And the obtained textile is dipped into a dipping solution, and then, stiffened to produce a 'dip cord' for tire of automobile that is composed of the resin-coated on the surface of the raw cord. Dipping is proceeded by wetting the textile with a solution of RFL composition(resorcinol-formaline-latex composition). This is for reinforcing the adhesive property because of the raw cord. Generally, layon or nylon is proceeded by one-pot dipping. But, in case of PET fiber, it is proceeded by two-pots dipping, wherein, the PET fiber is activated, and then, reinforced the adhesive property because the PET fiber has fewer reactive group than the layon fiber or nylon fiber. The lyocell multi filaments according to the present invention are proceeded by one-pot dipping. And the dipping solution for dipping tire cord is well known to the ordinary skilled technical expert in the art.

The thus obtained dip cord according to the present invention has 2,000 to 8,000 of total deniers and 12.0 to 28.0 kilogram of cutting load. And it can be used preferably for a tire cord of automobile.

Hereinafter, the present invention is described in detail with referenced to the following examples, but it is to be understood that the examples is solely for the purpose of illustration and do not limit the scope of the present invention. In the following examples, the estimating method and the measuring method as following is used.

(a) Quality Evaluation of Cellulose Solution

Quality evaluation of cellulose solution used in the examples is evaluated using a microscope (*1,000 magnification, made by Mitutoyo company) and a evaluation apparatus(Video copy processor SCT-P66, made by Mitsubishi company, Hi-Scope compact Micro Vision System KH-2200, made by Sharp company). It is declared by the number of not-liquified moiety in the area of 1 centimeter square, and classified into 5 grades. Samples are tested by three times and calculated the mean value. Under the grade of fourth is accounted as not homogenized solution, and the grade of third is accounted not fully swelled because of many factors. So, it is preferred to control all of the factors of the solution manufacturing apparatus that can affect to the property of the filament so as to obtain the grade of second as possible.

| The number of not-liquified cellulose powder/cm$^2$ | Grade |
|---|---|
| 0~3.5 | 1 |
| 3.6~7.0 | 2 |
| 7.1~10.5 | 3 |
| 10.6~13.0 | 4 (cannot use for dope) |
| More than 13.1 | 5 (cannot use for dope) |

(b) Degree of Polymerization (DPw)

The intrinsic viscosity [IV] of the dissolved cellulose is measured as follows. 0.5M cupriethylenediamine hydroxide solution in the range of 0.1 to 0.6 g/dl concentration obtained according to ASTM D539-51T is measured by using an Uberod viscometer at 25±0.01° C. The intrinsic viscosity is calculated from the specific viscosity by using the calculation method of extrapolation and then Mark-Hauwink's equation to obtain the degree of polymerization.

$$[IV]=0.98\times 10^{-2}DP_w^{0.9}$$

(c) Birefingency

Birefingency is measured using Berek compensator as a polarization microscope that the light source is Na-D.

(d) Tenacity(kgf) and Elongation at Specific Load (%)

The tenacity of the filament is measured using low speed elongation tester, and the filament is tested after being dried at 107° C. for 2 hours. The filament is twisted by 80 Tpm(80turns/meter) and the length of the filament is 250 millimeter and the elongation speed is 300 m/min. The elongation at specific load is the degree of elongation at 4.5 kilogram load.

(e) Shrinkage %

The shrinkage is represented the ratio of the length(L0) measured at 20 g static load after being treated at 25° C., 65% RH for 24 hours to the length(L1) measured at 30 g static load after being treated at 30° C. for 30 minutes.

$$S(\%)=(L_0-L_1)/L_0\times 100$$

(f) E-S

The elongation(E) means the elongation at specific load (EASL) in the present invention, and in this the specific load is 4.5 kilogram load. The specific load of 4.5 kilogram load means the maximum load acted to each tire cord. And 'S' means the shrinkage of the above item (d). The sum of the elongation(E) and shrinkage(S) and represents as 'E-S' in the present invention. Generally, the tire is vulcanized, the shrinkage and the elongation of the cord is changed. The sum of the elongation(E) and shrinkage(S), 'E-S' is similar to the modulus of the tire obtained. That is, if the value of 'E-S' is lowered, the modulus is raised. The modulus is raised, the operation property of the vehicle can be easy because the amount of force forming according to the transformation of the tire. Contrary, in case of the same extent of tension is required, it is possible to the small transformation of the tire. It means the operation property of the vehicle is good, and the stability of the shape of the tire is also good. So, the above value of 'E-S' is utilized to estimate the property of the tire. And, when manufacturing a tire, the cord having the low 'E-S' value can be used effectively because the deformation of the tire is low. So, it is possible to obtain good and morphologically uniform tire. And also, it is possible to obtain a tire having good property in case of using the low 'E-S' value cord in comparison with the case of using the high 'E-S' value. E-S=elongation (Elongation at 4.5 kg)+shrinkage

EXAMPLE 1

The cellulose powder is obtained by crashing pulp(DPw (degree of polymerization) of 1,200, made by Buckey company, alpha-cellulose contents of 97%) into powder having 100 micrometer or less diameter. And the cellulose powder is fed into an extruder at the speed of 1.2 kilogram/hour continuously. And at the same time, the NMMO hydrate comprising 13.5% by weight water at 90° C. is fed into the extruder using a fixed quantity-pump at the speed of 8.9 kilogram/hour continuously. In this time, the side feeder for feeding the NMMO is maintained at the temperature of 30° C. to 60° C. The screw of the twin-screw type extruder is rotated at the speed of 200 rpm, and the temperature of the region between the raw material feeding part and kneading part is maintained at the temperature in the range of 50 to 80° C. The cellulose powder and the solid-state NMMO is fed into the extruder and they are mixed, sheared and kneaded in the extruder so as to produce liquid-state cellulose solution. The concentration of the obtained cellulose solution(dope) is 11.5%. The properties of the obtained cellulose solution are shown in Table 1.

EXAMPLE 2

Another dope(cellulose solution) is prepared as described in Example 1 without the temperature of the region between the raw material feeding part and kneading part is maintained in the range of 50 to 110° C., so as to maintain the temperature of the kneading part more higher in comparison with that of the Example 1. The properties of the obtained cellulose solution are shown in Table 1.

EXAMPLE 3

Another dope(cellulose solution) is prepared as described in Example 2 without the content of the water in the liquid-state NMMO is controlled to 10% by weight. The properties of the obtained cellulose solution are shown in Table 1.

COMPARATIVE EXAMPLE 1

The cellulose powder is obtained by crashing pulp (DPw of 1,200, made by Buckey company, alpha-cellulose contents of 97%) into powder having 100 micrometer or less diameter. And the cellulose powder is fed into an extruder at the speed of 1.2 kilogram/hour continuously. And at the same time, the NMMO hydrate comprising 13.5% by weight water at 90° C. is fed into the extruder using a fixed quantity-pump at the speed of 8.9 kilogram/hour continuously. In this time, the screw of the twin-screw type extruder is rotated at the speed of 200 rpm, and the temperature of the region between the raw material feeding part and kneading part is maintained at the temperature in the range of 50 to 80° C. The cellulose powder and the solid-state NMMO is fed into the extruder and they are mixed, sheared and kneaded in the extruder so as to produce liquid-state cellulose solution. The concentration of the obtained cellulose solution(dope) is 11.5%. The properties of the obtained cellulose solution are shown in Table 1.

TABLE 1

|  | EXAMPLE 1 | EXAMPLE 2 | EXAMPLE 3 | COMPARATIVE EXAMPLE 1 |
|---|---|---|---|---|
| The number of not-liquified particle/cm$^2$ | 0.3 | 7.2 | 10.8 | 12.4 |
| The fraction of pack pressure rising($\Delta$P)/day(kg/cm$^2$) | 3.2 | 5.5 | 15.3 | 20.4 |
| Grade | 1 | 3 | 4 | 4 |

EXAMPLE 4

Another dope(cellulose solution) is prepared as described in Example 1. The spinning nozzles having their diameter of 120 millimeter and the number of orifice of each nozzle of 800, 1,000, 1,200 are used to manufacture the cellulose solution. The diameter of the orifice is 150 micrometer. L/D(length per diameter) of the orifice are all 4. The dope expelled from the spinning nozzle(head temperature of 110° C.) are aerated in the aeration layer apart from the nozzle with cooling air having the temperature of 20° C. and relative humidity of 40% RH at the speed of 4 m/sec. And, other conditions such as spinning amount and the speed of spinning are regulated to obtain multi filament having the final fineness of 1,500 to 2,000 deniers. The solidifying bath is regulated to the conditions that the temperature of the solidifying solution is 20° C. and the composition of the solidifying solution is 20% by weight NMMO and 80% by weight water. And, at that time, the cooling air and the solidifying solution are monitored using a sensor and a refractometer continuously. The remaining NMMO in the obtained filament withdrawn from the solidifying bath is removed by washing them. And then, the obtained filament are dried and winded. The properties of the obtained filament are shown in Table 2.

TABLE 2

|  | EXAMPLE 4 | | | | |
|---|---|---|---|---|---|
|  | A-1 | A-2 | A-3 | A-4 | A-5 |
| Condition |  |  |  |  |  |
| Diameter of the nozzle(mm) | 120 | 120 | 120 | 120 | 120 |
| Number of the nozzle orifice | 800 | 1000 | 1200 | 1000 | 1000 |

TABLE 2-continued

| | EXAMPLE 4 | | | | |
|---|---|---|---|---|---|
| | A-1 | A-2 | A-3 | A-4 | A-5 |
| Diameter of the nozzle orifice(μm) | 150 | 150 | 150 | 150 | 150 |
| Filament denier | 1510 | 1508 | 1502 | 1720 | 2004 |
| Property of the filament | | | | | |
| Tenacity (g/d) | 7.6 | 7.7 | 8.5 | 7.0 | 6.0 |
| EASL(%) | 1.1 | 1.0 | 1.1 | 1.3 | 1.4 |
| Elongation at break(%) | 5.6 | 5.3 | 4.9 | 5.6 | 5.7 |
| Modulus (g/d) | 307 | 310 | 330 | 290 | 271 |
| Birefringence | 0.044 | 0.045 | 0.049 | 0.043 | 0.041 |
| Shrinkage | 0.4 | 0.5 | 0.2 | 0.8 | 1.2 |

There are no problems according to the number of orifice. As increase the number of the orifice, the tenacity also increased and the mid-elongation and elongation at cutting are lowered in the viewpoint of the properties. In the viewpoint of the modulus, the modulus is highest in case of the number of the orifice is 1,200. In case of the fineness of the filament is controlled in the range of 1,500 to 2,000 deniers by controlling the amount of spinning and the speed of spinning, there are no problems in the viewpoint of the stickiness to the nozzle. And, as increase the filament's deniers, the tenacity is decreased and the elongation is increased in the viewpoint of properties.

EXAMPLE 5

After another dope(cellulose solution) is prepared as described in Example 2, filament fiber is prepared as described in Example 4. The properties of the obtained filament are shown in Table 3.

TABLE 3

| | EXAMPLE 5 | | | | |
|---|---|---|---|---|---|
| | A-1 | A-2 | A-3 | A-4 | A-5 |
| Condition | | | | | |
| Diameter of the nozzle(mm) | 120 | 120 | 120 | 120 | 120 |
| Number of the nozzle orifice | 800 | 1000 | 1200 | 1000 | 1000 |
| Diameter of the nozzle orifice(μm) | 150 | 150 | 150 | 150 | 150 |
| Filament denier | 1510 | 1508 | 1502 | 1720 | 2004 |
| Property of the filament | | | | | |
| Tenacity (g/d) | 7.6 | 7.7 | 8.5 | 7.1 | 6.1 |
| EASL(%) | 1.1 | 1.0 | 1.1 | 1.3 | 1.4 |

TABLE 3-continued

| | EXAMPLE 5 | | | | |
|---|---|---|---|---|---|
| | A-1 | A-2 | A-3 | A-4 | A-5 |
| Elongation at break(%) | 5.6 | 5.3 | 4.9 | 5.6 | 5.7 |
| Modulus (g/d) | 307 | 310 | 330 | 298 | 271 |
| Birefringence | 0.044 | 0.045 | 0.050 | 0.043 | 0.041 |
| Shrinkage | 0.4 | 0.5 | 0.2 | 0.8 | 1.1 |

The third grade of cellulose solution has almost no influence to the spinning properties, but the properties of the obtained fiber is lowered.

EXAMPLE 6

After another dope(cellulose solution) is prepared as described in Example 3, filament fiber is prepared as described in Example 4. The properties of the obtained filament are shown in Table 4.

TABLE 4

| | EXAMPLE 6 | | | | |
|---|---|---|---|---|---|
| | A-1 | A-2 | A-3 | A-4 | A-5 |
| Condition | | | | | |
| Diameter of the nozzle(mm) | 120 | 120 | 120 | 120 | 120 |
| Number of the nozzle orifice | 800 | 1000 | 1200 | 1000 | 1000 |
| Diameter of the nozzle orifice(μm) | 150 | 150 | 150 | 150 | 150 |
| Filament denier | 1510 | 1508 | 1502 | 1720 | 2004 |
| Property of the filament | | | | | |
| Tenacity (g/d) | 7.6 | 7.7 | 8.6 | 7.0 | 6.3 |
| EASL(%) | 1.1 | 1.0 | 1.1 | 1.3 | 1.4 |
| Elongation at break(%) | 5.6 | 5.3 | 4.9 | 5.6 | 5.7 |
| Modulus (g/d) | 307 | 310 | 330 | 290 | 270 |
| Birefringence | 0.044 | 0.045 | 0.049 | 0.043 | 0.041 |
| Shrinkage | 0.4 | 0.5 | 0.2 | 0.8 | 0.9 |

In case of the fourth grade of cellulose fiber is used, the spinning properties and the properties of the obtained fiber is lowered.

COMPARATIVE EXAMPLE 2

After another dope(cellulose solution) is prepared as described in Comparative example 1, filament fiber is prepared as described in Example 4. The properties of the obtained filament are shown in Table 5.

TABLE 5

| | COMPARATIVE EXAMPLE 2 | | | | |
|---|---|---|---|---|---|
| | A-1 | A-2 | A-3 | A-4 | A-5 |
| Condition | | | | | |
| Diameter of the nozzle(mm) | 120 | 120 | 120 | 120 | 120 |
| Number of the nozzle orifice | 800 | 1000 | 1200 | 1000 | 1000 |
| Diameter of the nozzle orifice(μm) | 150 | 150 | 150 | 150 | 150 |
| Filament denier | 1510 | 1508 | 1502 | 1720 | 2004 |
| Property of the filament | | | | | |
| Tenacity (g/d) | 5.6 | 5.7 | 6.1 | 4.9 | 4.5 |
| EASL(%) | 1.1 | 1.0 | 1.1 | 1.3 | 1.4 |
| Elongation at break(%) | 5.6 | 5.3 | 4.7 | 5.6 | 5.7 |
| Modulus (g/d) | 283 | 287 | 300 | 247 | 245 |
| Birefringence | 0.041 | 0.042 | 0.045 | 0.041 | 0.039 |
| Shrinkage | 0.6 | 0.7 | 0.4 | 0.9 | 2.3 |

In case of the relative example 2, the tenacity is too low and cannot be used to manufacture a tire. And in case of the fineness is 2,300 deniers, it is required to use more cord than a proper amount of cord to make a tire.

INDUSTRIAL APPLICABILITY

According to the present invention, there is provided homogeneous cellulose solution that minimized thermal-degradation. The cellulose solution can be used to produce a cellulose-made article such as fiber, filament, film or tube, etc. More specifically, the fiber manufactured by using the above cellulose solution is excellent in tenacity and dimensional stability and may be used for making industrial filament fiber or reinforcing material of rubber-made products such as tire or belt.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for continuously producing a cellulose solution with a mixture of N-methylmorphorine-N-oxide (NMMO) containing water and cellulose powder, comprising:
    (A) feeding NMMO into a twin-screw extruder through a first side feeder of the twin-screw extruder;
    (B) feeding compressed cellulose powder extruder through a second side feeder of the twin-screw extruder at the same time as feeding NMMO in step (A); and
    (C) obtaining a swelled and homogenized cellulose solution by dispersing, mixing, shearing, kneading, melting and measuring the mixture of NMMO and cellulose powder from the twin-screw extruder, wherein the phase of NMMO through the first side feeder in step (A) is in a solid state by cooling initial liquid-state NMMO within a few seconds.

2. The method of claim 1, the cellulose powder used in the step (B) has a particle size of less than 5,000 micrometer.

3. The method of claim 1, the swelled and homogenized cellulose solution in step (C) contains 3 to 20% by weight of the cellulose with respect to the total weight of the cellulose solution.

4. The method of claim 1, the initial liquid-state NMMO contains 10 to 18% by weight of water with respect to the total weight of the NMMO solution.

5. The method of claim 1, the temperature of the twin-screw in the first side feeder in step (A) is maintained between −10 to 80° C.

6. The method of claim 1, in the step (B) the cellulose powder comprises a polymer or an additive, wherein the polymer is at least one selected from polyvinylalcohol, polyethylene, polyethyleneglycol or polymethylmethacrylate, and the additive is at least one selected from a thickener, titanium dioxide, silica (silicone dioxide), carbon or ammonium chloride.

7. A method for continuously producing a cellulose solution with a mixture of N-methylmorphorine-N-oxide (NMMO) containing water and cellulose powder, comprising:
    (A) feeding a NMMO into a twin-screw extruder through a first side feeder of the twin-screw extruder while maintaining a temperature of −10 to 80° C;
    (B) feeding compressed cellulose powder extruder through a second side feeder of the twin-screw extruder at the same time as feeding NMMO in step (A); and
    (C) obtaining a swelled and homogenized cellulose solution by dispersing, mixing, shearing, kneading, melting and measuring the mixture of NMMO and cellulose powder from the twin-screw extruder, wherein the phase of NMMO through the first side feeder in step (A) is in a solid state by cooling initial liquid-state NMMO containing 8 to 20% by weight of the cellulose within a few seconds.

* * * * *